Patented July 5, 1932

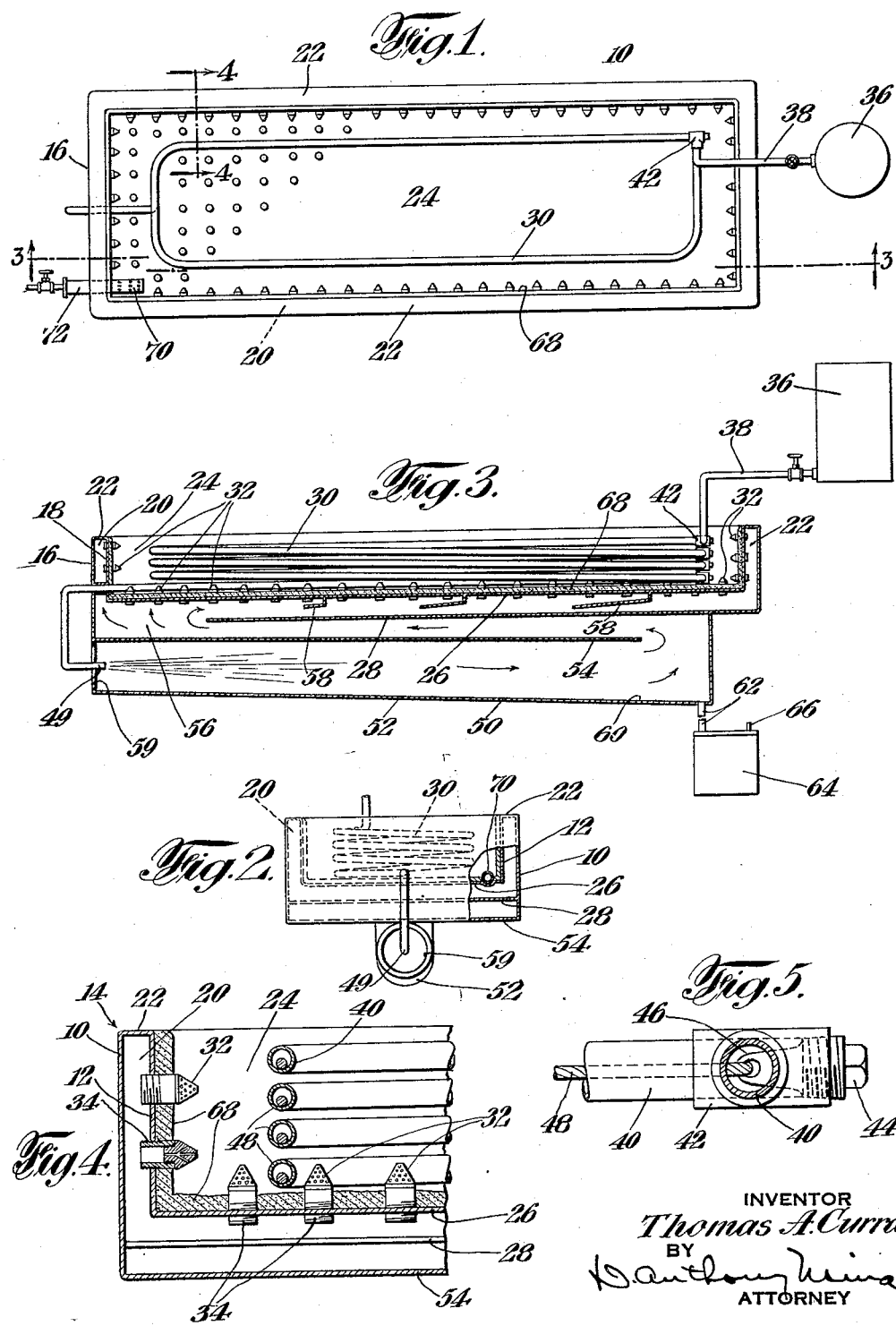

1,865,889

UNITED STATES PATENT OFFICE

THOMAS A. CURRAN, OF NEW YORK, N. Y., ASSIGNOR TO HUGH J. SHEERAN, OF NEW ROCHELLE, NEW YORK

LIQUID FUEL BURNER

Application filed March 15, 1929. Serial No. 347,313.

This invention relates to improvements in liquid fuel burners and aims to provide a burner in which the several parts are so combined that an extremely efficient burner having a long useful life is obtained.

The invention will be apparent from the following specification when read in connection with the acompanying drawing and the features of novelty will be defined with particularity in the appended claims. In the drawing—

Fig. 1 is a plan view illustrating a burner embodying the invention;

Fig. 2 is an end elevation of the burner shown in Fig. 1;

Fig. 3 is a longitudinal sectional view taken on line 3—3 of Fig 1;

Fig. 4 is an enlarged sectional view taken on line 4—4 of Fig. 1;

Fig. 5 is a detached detail view of a portion of the vaporizer coil.

Referring in detail to the drawing 10 and 12 represent upright spaced parallel sheet metal side walls of a manifold member which is indicated as a whole by numeral 14. End walls 16 and 18 are united to the walls 10 and 12 and the manifold chamber 20 is enclosed at the top wall 22 secured to the wall 10, 12, 16 and 18. The manifold member 14 is formed with a cavity 24 the bottom of which is formed by a wall 26 which is united to the inner walls 12 and 16. Spaced below the wall 26 is a bottom wall 28 which is united to the outer side and end walls 10 and 16 respectively as shown. The double walled construction described forms a manifold chamber 20 which is substantially U-shaped in cross-section and rectangular in plan, and also provides the substantially rectangular cavity 24 for the accommodation of a vaporizer 30 and a multiplicity of nozzles 32.

The manifold member need not necessarily be of rectangular shape as obviously the same general principles may be incorporated in a number of elliptical or circular shapes in plan. The member 14 is preferably made of sheet metal plates which can be punched out by suitable dies and formed to the desired shapes. The meeting parts of the different walls can be electrically welded or otherwise united to form a gas tight chamber 20.

Sheet metal is preferred rather than cast iron or the like because of the saving in weight and because of its greater tensile strength as compared with cast iron.

The multiplicity of outlet nozzles 32 are detachably threaded in nipples 34 which are threaded or otherwise secured to the inner side, and end walls 12 and 18 respectively and to the bottom wall 26 as shown. Each nozzle is provided with a main inlet orifice and a plurality of outlet orifices each terminating interiorly in the main inlet orifice substantially as indicated in Fig. 4. Preferably also the top of the nozzle is conical and the plurality of outlet orifices are disposed about the conical tip in the manner indicated. Thus it is clear that all of the nozzles are fed from the common manifold chamber 20.

Liquid fuel for the burner is fed either by gravity or under pressure from a supply tank 36 which is connected by a pipe 38 with the vaporizer 30 above referred to.

The vaporizer illustrated is a coil formed of a plurality of separate convolutions 40 united by connections 42. Each connection is normally closed by a threaded plug 44 which has a lug 46 to which is secured a cleaning cable 48. By providing a separate connection 42 and a separate cable 48 for each convolution of the coil, no one cable makes more than one turn. Thus the cables will not bind when pulled and pushed upon the uncoupling and manipulation of the plug 44 for the purpose of cleaning the interior of the vaporizers.

The outlet end of the vaporizer coil passes through openings in wall 16 and 18 of the manifold structure 14 and at 49 enters a mixing chamber 50 formed by a shell-like casing 52 secured to the underside of the wall 28 of the manifold structure a baffle plate 54 extends lengthwise of the mixing chamber and compels the gaseous mixture to flow in the circuitous path indicated by the arrows. The mixture from the chamber 50 passes through a port 56 to the manifold chamber 20 and out through the multiplicity of nozzle 32. Suitably spaced and located baffles 58 are provided to ensure that there is an even distribution of fuel to all of the nozzles at substantially the same pressure when the burner is initially started. Air is admitted to the mixing chamber through the opening 59 in the end thereof.

The lower surface 60 of the casing 52 is inclined so that any liquid drip or condensate will drain to the outlet 62 at the low end of the casing. A tank 64 having a suitable vent 66 is connected with the outlet 62 for collecting the drip and thus serves to prevent flooding the mixing chamber.

For protecting the inner walls of the manifold structure a layer of heat insulating or refractory material 68 is provided. This layer covers the entire inner surface of the walls 12, 18 and 26 but the burner nozzles 32 extend through it as shown. Thus they can be removed for cleaning or replacement without disturbing the lining 68.

For starting or initially igniting the fuel a pilot lighter tube 70 is provided. This tube is so mounted that only about one half of its surface is exposed to the direct radiant heat of the burner. The lower half is protected by the insulating material 68, and a portion 72 extends outwardly beyond the wall 16 and is thus exposed to the cooling action of the surrounding atmosphere.

In operation the liquid fuel such as gasoline, kerosene or the like flows from the tank 36 to the coil 30 where it is vaporized by the heat from the nozzles. The vapor passes to the mixing chamber 50 where it mixes with air thus forming a combustible gas.

This gaseous mixture flows to the manifold chamber 20 and then out through the multiplicity of nozzles 32 where combustion takes place.

While I have described in great detail the design and arrangement of the embodiment of the invention illustrated it is not to be construed that I am limited thereto since various modifications may be made by those skilled in the art without departing from the invention as defined in the appended claims.

I claim:

1. A liquid fuel burner comprising a combustion chamber and a mixing chamber, a plurality of burner nozzles opening into the bottom and side walls of the combustion chamber from the mixing chamber, fuel preheating and vaporizing means in the combustion chamber, means to introduce liquid fuel into said fuel preheating and vaporizing means and thence into the mixing chamber, means to admix air with the fuel vapor in the mixing chamber, means to remove the unvaporized portion of the fuel from the mixing chamber and baffle means to equally distribute the air-gas fuel mixture to the plurality of burner nozzles.

2. A liquid fuel burner comprising a combustion chamber and a mixing chamber, the mixing chamber substantially enclosing the bottom and a part of the sides of the combustion chamber, a plurality of burner nozzles opening into the combustion chamber from the mixing chamber through the bottom and side areas enclosed thereby, fuel preheating and vaporizing means within the combustion chamber adjacent said burner nozzles, means to introduce liquid fuel into said fuel preheating and vaporizing means under pressure and thence into the mixing chamber, means to admix air with the vaporizing liquid fuel in the mixing chamber, means to remove the unvaporized portion of the fuel, and baffle means to uniformly distribute the air-gas fuel admixture to the plurality of burner nozzles.

3. A liquid fuel burner comprising a refractory lined combustion chamber and a mixing chamber, the mixing chamber substantially enclosing the bottom and a part of the sides of the combustion chamber, a plurality of burner nozzles opening into the combustion chamber from the mixing chamber through the bottom and side areas enclosed thereby, fuel preheating and vaporizing means within the combustion chamber adjacent said burner nozzles, means to introduce liquid fuel into said fuel preheating and vaporizing means under pressure and thence into the mixing chamber, means to admix air with the vaporized liquid fuel in the mixing chamber, means to remove the unvaporized portion of the fuel, and baffle means to uniformly distribute the air-gas fuel admixture to the plurality of burner nozzles and means comprising a pilot burner disposed within the combustion chamber to ignite the air-gas admixture.

In witness whereof, I have hereunto signed my name.

THOMAS A. CURRAN.